United States Patent
Kurachi et al.

(10) Patent No.: US 7,425,125 B2
(45) Date of Patent: Sep. 16, 2008

(54) ROLLER FOR FORMING NOODLES AND THE LIKE

(75) Inventors: Masayasu Kurachi, Aichi-ken (JP); Hideto Ohmi, Aichi-ken (JP); Teruyuki Uchiyama, Aichi-ken (JP); Toshiki Sugimoto, Aichi-ken (JP); Yoshitaka Yoshida, Aichi-ken (JP); Atsushi Nakamura, Aichi-ken (JP)

(73) Assignees: Yutaka Mfg. Co., Ltd, Kounan-shi, Aichi-ken (JP); Nippon Steel Hardfacing Co. Ltd., Tokai-shi, Aichi-ken (JP); Kabushiki Kaisha Yoshida S.K.T., Nagoya-shi, Aichi-ken (JP)

( * ) Notice: Subject to any disclaimer, the term of this patent is extended or adjusted under 35 U.S.C. 154(b) by 608 days.

(21) Appl. No.: 11/138,085

(22) Filed: May 27, 2005

(65) Prior Publication Data

US 2005/0266136 A1 Dec. 1, 2005

(30) Foreign Application Priority Data

Jun. 1, 2004 (JP) ............................. 2004-163132

(51) Int. Cl.
*A21C 3/02* (2006.01)

(52) U.S. Cl. ........................... 425/471; 492/30; 492/53; 492/54; 492/56

(58) Field of Classification Search ................. 425/363, 425/371, 471; 249/114.1, 115; 492/30, 53, 492/54, 56

See application file for complete search history.

(56) References Cited

U.S. PATENT DOCUMENTS

| | | | | |
|---|---|---|---|---|
| 3,271,653 | A * | 9/1966 | Wolf | 220/573.2 |
| 3,419,414 | A * | 12/1968 | Marks | 428/601 |
| 3,773,544 | A * | 11/1973 | Newton et al. | 428/609 |
| 3,942,230 | A * | 3/1976 | Nalband | 492/53 |
| 4,704,776 | A * | 11/1987 | Watanabe et al. | 492/54 |
| 4,793,041 | A * | 12/1988 | Jenkins et al. | 492/37 |
| 5,283,121 | A * | 2/1994 | Bordner | 492/54 |
| 6,080,496 | A * | 6/2000 | Hupf et al. | 428/626 |
| 6,616,584 | B2 * | 9/2003 | Hyllberg et al. | 492/54 |
| 6,666,806 | B2 * | 12/2003 | Kaprelian et al. | 492/56 |

* cited by examiner

*Primary Examiner*—James Mackey
(74) *Attorney, Agent, or Firm*—Dennison, Schultz & MacDonald

(57) ABSTRACT

A roller (1) for forming noodles and the like (W) comprises a roller body (2), an intermediate layer (4) and a fluoropolymer layer (3). The intermediate layer (4) is formed from a thermally sprayed material with open cells such as a ceramic. The open cells of the intermediate layer (4) permit intrusion of fluoropolymer therein. The intermediate layer (4) binds the surface of the roller body (2) with the fluoropolymer layer (3).

10 Claims, 4 Drawing Sheets

ROLLER FOR FORMING NOODLES AND THE LIKE

This application claims priority to Japanese patent application serial number 2004-163132, the contents of which are incorporated herein by reference.

BACKGROUND OF THE INVENTION

1. Technical Field

The present invention relates to a roller for forming noodles and the like, and in particular, to a roller used in a forming apparatus for making such noodles as Japanese noodles, Chinese noodles or buckwheat noodles, dumpling dough, wonton dough, or wheat-based dough (hereinafter "noodles and the like").

2. Description of the Related Art

A roller for forming noodles and the like is generally used when forming wheat-based noodle dough, which is made by mixing and beating wheat flour, salt, water, etc., into a sheet-shaped material, or a noodle sheet. The thickness of a noodle sheet is sequentially modified into a predetermined thickness in the course of the forming process.

The forming process mainly comprises three specific stages: an initial stage, or a rough noodle sheet forming process; a middle stage, or a multistage rolling process; and a last stage, or a finishing process. The surface roughness of the rollers used in each stage varies according to the characteristics of the corresponding stage. Thus, the roller surface is rough for the rough noodle sheet forming process, while the roller surface is fine for the finishing process.

In the forming process, especially in a rolling process, it should be understood that rollers are in contact with a noodle sheet. Moreover, a certain part of the noodle sheet is pressed by the roller surface during the rolling process, wherein the pressure applied to the noodle sheet depends mainly on the pressing force applied to the roller and the rolling velocity. Therefore, when used in the rolling process, some deposits from the noodle sheet typically adhere to the roller surface according to the pressing force and the rolling velocity.

Such deposits (hereinafter "noodle scraps") are conventionally removed from the roller with a scraper blade, which is made of material softer than the roller and is lightly abutted on the corresponding roller surface. The scraper blade scrapes off the noodle scraps while the roller is rolling during the noodle sheet forming process.

However, although the scraper blade effectively removes noodle scraps from the roller surface, it produces powder-like wastes when scraping the roller surface as well as a mass of noodle scraps built-up on the edge of the scraper blade. The powder-like wastes or the built-up noodle scraps may fall as contaminants onto the noodle sheet before or after the forming process. It should be noted that such contaminants degrade the noodle sheet quality and the contaminated noodle sheet is useless as a product. In addition, in the case where a strong abutment is provided between the scraper blade and the roller surface, the scraper blade may scratch the roller surface with time even if the scraper blade is softer than the roller surface. This may lead to salt corrosion on the roller surface, especially when a noodle sheet containing salt is processed. Otherwise, the scratched roller surface may cause the noodle sheet to be rough-surfaced, which results in urging the noodle sheet to more easily adhere to the roller. At the same time, there may happen other problems undesirable to the product quality of the noodle sheet.

In order to solve the aforementioned problems, it is well-known to coat the roller surface with fluoropolymer. The fluoropolymer roller surface is adhesive-releasing and prevents a noodle sheet from adhering thereto. This may allow the scraper blade to be removed.

However, the effectiveness of fluoropolymer coating does not last long, which is one of the main characteristics of fluoropolymer coating. Specifically, the fluoropolymer coating is easily worn out or peeled away from the roller surface. Thus, it is not preferable to employ such fluoropolymer coating for a noodle sheet forming apparatus that will need to be in service for many years.

Contrarily, when used in the aforementioned rough noodle sheet forming process, the fluoropolymer roller surface is too slippery. The rough noodle sheet forming process requires a certain frictional resistance for advancing a noodle sheet forward.

SUMMARY OF THE INVENTION

It is one object of the present invention to teach a roller for forming noodles and the like, wherein the surface of the roller allows a noodle sheet to be easily released without having to use a scraper blade for removing noodle scraps from the surface.

According to one aspect of the present teachings, a roller for forming noodles and the like is taught which may include a roller body, a fluoropolymer layer and an intermediate layer. The fluoropolymer layer may define an outer surface of the roller. The intermediate layer may be formed between the roller body and the fluoropolymer layers from a thermally sprayed material, which preferably comprises ceramic. The intermediate layer may bond the fluoropolymer layer to the roller body.

With the aforementioned configuration, the intermediate layer enables the fluoropolymer layer to adhesively stay on the roller surface. Therefore, the fluoropolymer layer is enhanced in durability and prevented from being easily worn out or peeled away from the roller surface. Thus, a roller is obtained which can be in service for many years.

According to another aspect of the present teachings, the intermediate layer may consist of a first layer and a second layer formed from a thermally sprayed material. Preferably, the first layer comprises a nickel-chromium alloy, while the second layer comprises a ceramic.

With the aforementioned configuration, the first layer enables the fluoropolymer layer on the second layer to adhesively stay on the roller surface. Therefore, the fluoropolymer layer is further prevented from being easily worn out or peeled away from the roller surface.

According to another aspect of the present teachings, the roller body comprises a plurality of protrusion portions thereon. Therefore, controlling the geometrical configuration of the protrusion portions may modify the surface roughness of the roller according to each stage of forming noodles and the like. Thus, a roller is obtained which keeps its adhesive-releasing ability with regard to noodles and the like, but yet is rough-surfaced for various forming uses.

Additional objects, features and advantages of the present invention will be readily understood after reading the following detailed description together with the claims and the accompanying drawings.

BRIEF DESCRIPTION OF THE DRAWINGS

FIG. 3 is a schematic side view in elevation, showing a circumferential cross-sectional view of the first embodiment of the present invention used for forming noodles and the like;

DETAILED DESCRIPTION OF THE INVENTION

Each of the additional features and teachings disclosed above and below may be utilized separately or in conjunction with other features and teachings to provide improved rollers for forming noodles and the like and methods for designing and using such rollers. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Now, a roller for forming noodles and the like according to a first embodiment of the present invention will be described with reference to FIGS. 1 to 3. The roller 1 will typically be used in such a pair of two rollers as shown in FIG. 3. However, the use is not limited to such paired use. For example, noodles and the like may be formed with a combination of a single roller and a belt conveyer.

Figure 1:
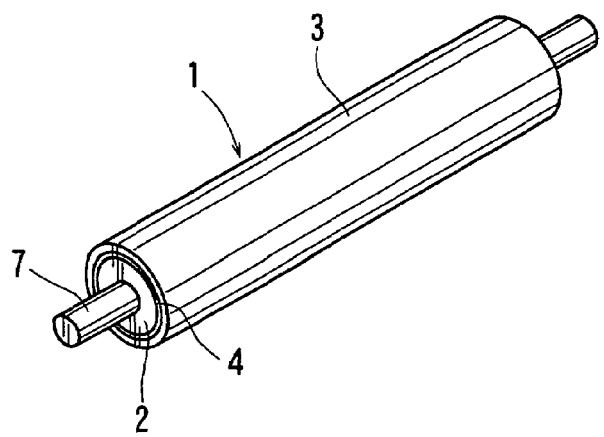
FIG. 1 is a perspective view of a roller of a first embodiment of the present invention.

FIG. 1 shows a roller 1 having a cylindrical roller body 2 with a shaft 7 in its rotational center. The cylindrical roller body 2 is preferably made of corrosion resistant alloy, or finished with an anti-corrosion surface treatment. Around the roller body 2, an intermediate layer 4 is formed by a thermally sprayed material. The thermally sprayed material includes, but is not limited to, ceramic, metal or cermet. Preferably, ceramic particles may be thermally sprayed on the roller body 2. The intermediate layer 4, porous with open cells, may be formed on the roller body surface. More preferably, such ceramic particles may comprise almina, zirconia, chromia, or a mixture thereof. Then, a fluoropolymer layer 3 is coated on the intermediate layer 4 in a conventional manner. The intermediate layer 4 strongly binds the surface of the roller body 2 with the fluoropolymer layer 3 because the open cells of the intermediate layer 4 permit intrusion of the fluoropolymer therein. The fluoropolymer layer 3 will be hooked to the intermediate layer 4.

Figure 2:
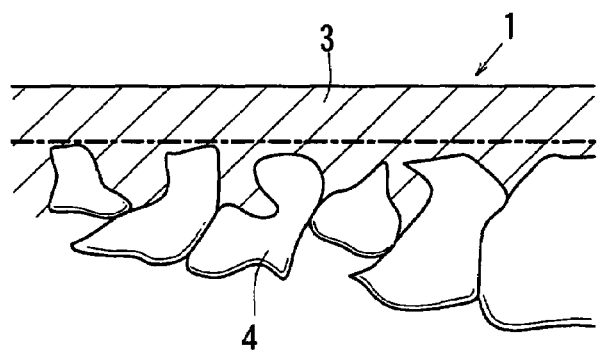
FIG. 2 is a enlarged scale sectional view, showing a longitudinal cross-section near the surface of the roller of FIG. 1.
Figure 3:
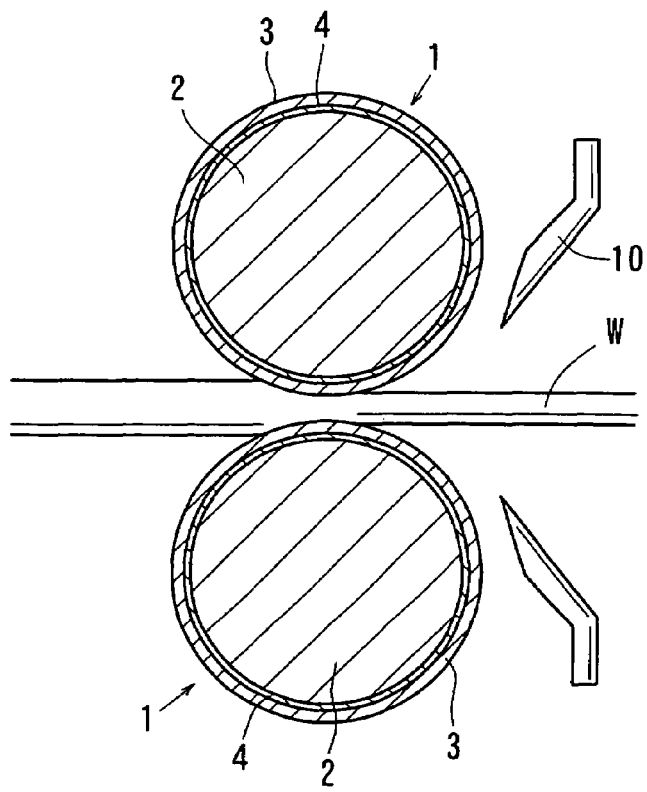

FIG. 2 shows the interlocking structure in detail. The fluoropolymer may take root in the open cells of the intermediate layer 4. In this manner, the fluoropolymer layer 3 is adhesively coated onto the roller 1. Thus, this fluoropolymer coating allows the fluoropolymer layer 3 to stay on the roller surface for a long period of time.

The fluoropolymer intruded into the open cells of the intermediate layer 4 has an additional advantage. Even if the fluoropolymer layer 3 has gradually worn out to the level of the dashed line in FIG. 2 with the passing of time, the intermediate layer 4 still keeps the remaining fluoropolymer on the surface thereof. Therefore, even after the fluoropolymer layer 3 has partially worn out, it will not be necessary to immediately replace the roller 1 because the coating effectiveness still lasts on the roller 1. The roller surface may still keep adhesive-releasing for noodles and the like, and also salt corrosion thereon may still be effectively prevented.

FIG. 3 shows a typical example of the use of the roller 1. As shown in FIG. 3, the rollers 1 are arranged in a pair of two rollers opposed to each other. A noodle sheet W, already formed from wheat-based noodle dough, is rolled into a thinner one by the rollers 1. The noodle sheet W is fed forward from the left to the right with respect to FIG. 3. Guiding portions 10 are used for preventing the noodle sheet from being out of a proper sending direction of the noodle sheet W.

Figure 4:
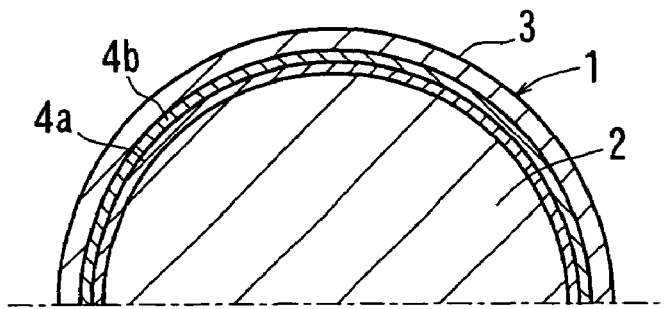
FIG. 4 is a circumferential cross-sectional view, showing a semi-circumferential cross-sectional view of a roller of a second embodiment of the present invention.

With reference to FIG. 4, wherein a second embodiment of the present invention is illustrated and like numerals have been employed to denote like components of the previous embodiment, the intermediate layer 4 comprises two layers 4a and 4b. The inner layer 4a is formed directly on the surface of a cylindrical roller body 2 with thermally sprayed metal particles. Preferably, the metal particles comprise a nickel-chromium alloy. However, other metal may be applied such as nickel based metal, chrome based metal, iron based metal, or molybdenum based metal.

On the other hand, the outer layer 4b is formed between the inner layer 4a and the fluoropolymer layer 3. The outer layer 4b is preferably made of a porous ceramic. Thus, the inner layer 4a is higher in density than the outer layer 4b because the outer layer 4b comprises ceramic, while the inner layer 4a comprises metal. The inner layer 4a may work as a substrate layer of the outer layer 4b. Such a dual layer structure enhances the stability and the life of the fluoropolymer layer 3 because the surface of the roller body 2 is protected with the inner layer 4a and improved in corrosion resistance and mechanical strength. Thus, the roller 1 is allowed to be used for many years.

It should be understood that the surface roughness of each intermediate layer 4a or 4b can be adjusted by selecting the particle diameter of the thermally sprayed material. This allows the roller 1 to be modified according to the corresponding use. For example, if the roller 1 is to be used in the last stage of the noodle sheet forming process, or a finishing process, the particle diameter may be smaller and the roller surface can be finer.

Figure 5:
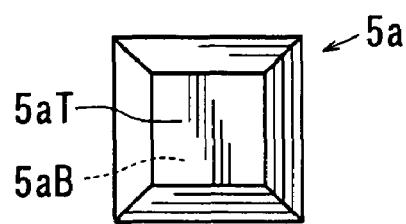
FIG. 5(a) is a plan view of a truncated quadrangular pyramid with a larger top area of the third embodiment of the present invention.
FIG. 5(b) is a front view of the truncated quadrangular pyramid of FIG. 5(a)
Figure 5:
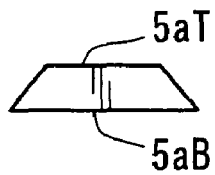

With reference to FIGS. 5(a) and 5(b), wherein a third embodiment of the present invention is illustrated, a plurality of protrusion portions 5a are formed and arranged on the surface of a cylindrical roller body 2. The frictional resistance of the roller surface may therefore be increased. This is preferable for the initial stage of the noodle sheet forming process because the rollers 1 should catch the wheat-based dough and form it into a rough noodle sheet. Shown in FIGS. 5(a) and 5(b), the geometric configuration of the protrusion portions 5a is specifically a truncated quadrangular pyramid with a top area 5aT and a bottom area 5aB. The top area 5aT is smaller than the bottom area 5aB and, not shown, the top area 5aT is directed outward with respect to the rotation axis of the roller 1. The protrusion portions 5a may typically be formed and arranged evenly on the roller surface. However, according to the noodle sheet forming process, an uneven arrangement may be preferable.

Figure 6:
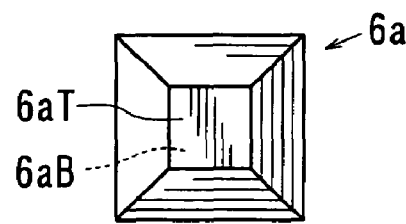
FIG. 6(a) is a plan view of a truncated quadrangular pyramid with a smaller top area of the fourth embodiment of the present invention.
FIG. 6(b) is a front view of the truncated quadrangular pyramid of FIG. 6(a)
Figure 6:
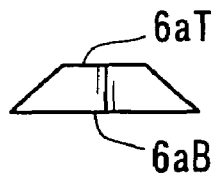
Figure 7:
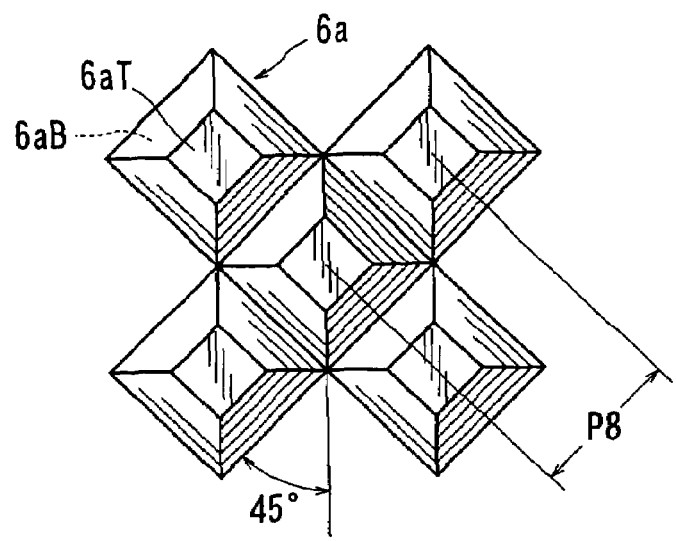
FIG. 7 is a plan view showing the arrangement of a plurality of protrusion portions of FIGS. 6(a) and 6(b)

With reference to FIGS. 6(a) and 6(b), wherein a fourth embodiment of the present invention is illustrated, a plurality of protrusion portions 6a are shown which are similar to the protrusion portions 5a in FIGS. 5(a) and 5(b). The only difference is in the size of the top area 6aT. The protrusion portion 6a in FIGS. 6(a) and 6(b) is smaller than that of FIGS. 5(a) and 5(b) in the area ratio of the top area 6aT to the bottom area 6aB. In this manner, the roughness of the roller surface may be modified according to the use of the roller 1. FIG. 7 shows the arrangement of the protrusion portions 6a in a developed form. It is preferable that the protrusion portions 6a are evenly arranged on the roller surface with a pitch of P8 (8 millimeters). The edge line of the square-shaped bottom area 6aB is preferably disposed at an angle of 45 degrees with respect to the circumferential rolling direction of the roller 1.

It should be noted that although FIG. 7 shows the arrangement of the protrusion portions 6a, such an arrangement may be applicable to the protrusion portions 5a of FIGS. 5(a) and 5(b). In addition, a mixed arrangement of the protrusion portions 5a and 6a may easily be possible because the geometries of both of the bottom areas 5aB and 6aB are the same. Even though such configurations are provided on the roller surface, the roller surface maintains a good adhesive-releasing property with regard to a noodle sheet because of the effectiveness of the fluoropolymer layer 3.

It should be understood that the surface roughness of the roller 1 may be affected by the geometric configuration of the protrusion portions 5a or 6a. With respect to the area ratio of the top area 5aT or 6aT to the bottom area 5aB or 6aB of the truncated quadrangular pyramids shown in FIGS. 5(a) through 6(b), it is preferable for the area ratio to be from 10% to 70% according to the noodle sheet forming process.

Figure 8:
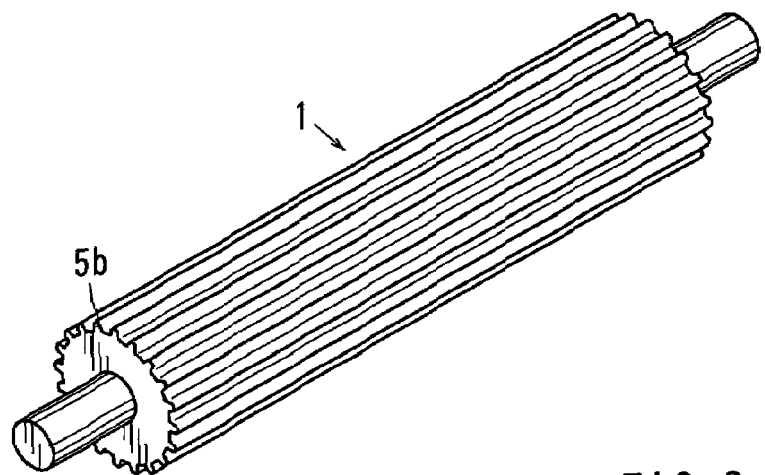
FIG. 8 is a perspective view of a roller of a fifth embodiment of the present invention.

With reference to FIG. 8, wherein a fifth embodiment of the invention is illustrated, a roller 1 is formed into a gear-shaped roller. Protrusion portions 5b may also increase the frictional resistance with a noodle sheet as well as the protrusion portions 5a or 6a in the aforementioned embodiments. Such a gear-shaped configuration is also preferable for an initial stage of the noodle sheet forming process. However, the height of the protrusion portions 5b may be modified for other forming processes.

Figure 9:
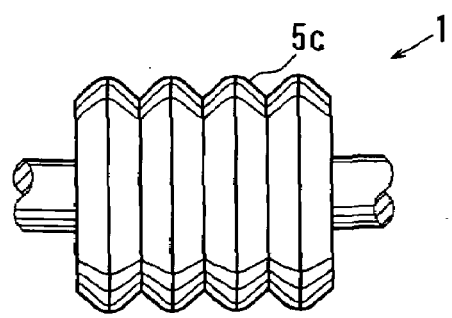
FIG. 9 is an elevational view of a roller of a sixth embodiment of the present invention.

With reference to FIG. 9, wherein a sixth embodiment of the invention is illustrated, a roller 1 is formed into a corrugate-tube-shaped roller. With regard to the feeding direction of a noodle sheet W, or the rolling direction, this geometric configuration does not have much effect on the frictional resistance. However, using this type of the roller 1 may enable an effective kneading process necessary for noodle making.

Figure 10:
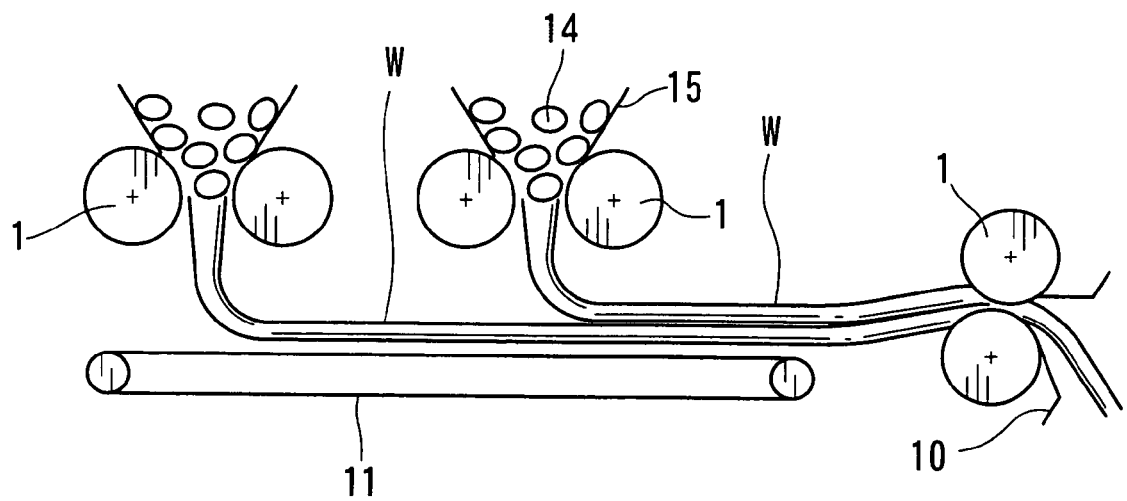
FIG. 10 is a schematic side view in elevation, showing a rough noodle sheet forming process with two rough noodle sheets formed and then rolled into one noodle sheet.
Figure 11:
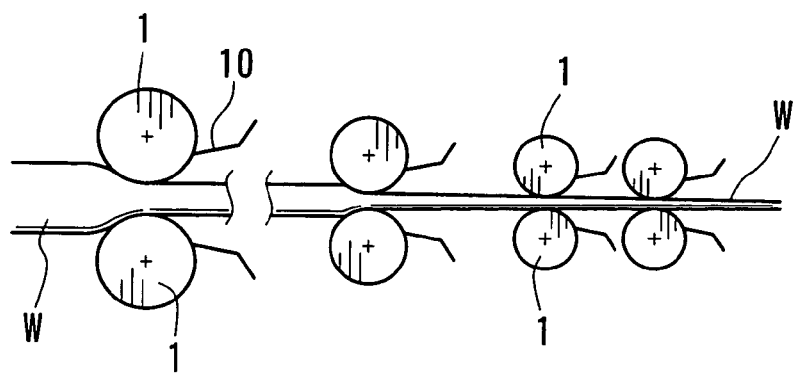
FIG. 11 is a similar view to FIG. 10, showing a multistage rolling process with a noodle sheet rolled sequentially into a thinner noodle sheet.
Figure 12:
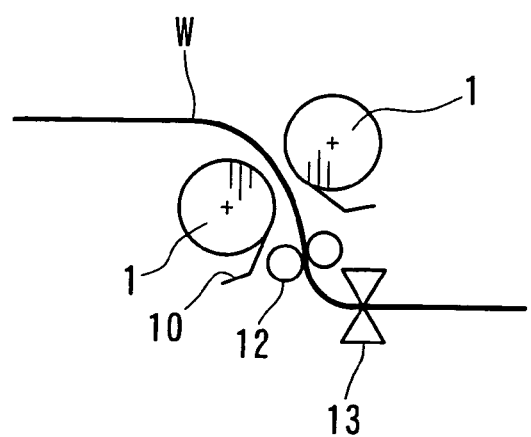
FIG. 12 is a similar view to FIG. 10, showing a finishing process with a noodle sheet finally cut into certain portions.

With reference now to FIGS. 10 to 12, wherein it is illustrated how a roller 1 is used to form a noodle sheet in each of the aforementioned three specific stages, like numerals have been employed to denote like components of the previous embodiments.

FIG. 10 shows a schematic view of an initial stage, or a rough noodle sheet forming process. Firstly, wheat-based dough 14 is fed into each feeding funnel 15 and formed into rough noodle sheets W by a pair of rollers 1 arranged opposed to each other. Then, the rough noodle sheets W are sent onto a belt conveyor 11 to another pair of rollers 1 and rolled into a single noodle sheet W. Specifically, in the configuration of FIG. 10, two rough noodle sheets W are laid and flow from the left to the right on the belt conveyor 11, and combined into a noodle sheet W by rollers 1 with the outlet direction of noodle sheet being guided by guiding portions 10. Due to the roller surfaces coated with a fluoropolymer layer 3, the noodle sheet W can be easily released from the rollers 1 and transferred into the next stage.

In the initial stage, the surface roughness is preferably adjusted to the range of 15 Ra (15 micrometers in average roughness) to 20 Ra, or the range of 7 Ra to 10 Ra. It should be understood that the roller surface may be preferable with protrusion portions 5a or 6a as described above as the third and fourth embodiments, wherein the desirable area ratio of the top area 5aT or 6aT to the bottom area 5aB or 6aB is the range of 10% to 15%, or the range of 40% to 70%.

FIG. 11 shows a schematic view of a middle stage, or a multistage rolling process. A thicker noodle sheet W is sent from the aforementioned initial stage and is sequentially rolled by several pairs of rollers 1 arranged opposed to each other. The thicker noodle sheet W is formed gradually into a thinner noodle sheet W.

In the middle stage, the surface roughness is preferably adjusted to the range of 5 Ra to 15 Ra, wherein although a noodle sheet W is formed wide with respect to longitudinal direction of the rollers 1, the noodle sheet W can be easily released from the rollers 1 because of the effectiveness of the fluoropolymer layer 3.

FIG. 12 shows a schematic view of a last stage, or a finishing process. The thinnest and finest noodle sheet W is processed through a last pair of rollers 1, sent finally through a slitter 12, which is configured as a pair of rollers, and then cut with a cutter 13 into a final noodle sheet product.

In the last stage, the surface roughness is preferably adjusted to the range of 0.5 Ra to 5 Ra, wherein the noodle sheet W can be formed into a smoothed-surface noodle sheet W and can be easily released from the rollers 1.

Although only preferred embodiments are specifically illustrated and described herein, it will be appreciated that many modifications and variations of the invention are possible in light of the above teachings and within the purview of the claims, without departing from the spirit and intended scope of the invention.

The invention claimed is:

1. A roller for rolling noodles and the like, comprising:
   a roller body;
   a fluoropolymer layer defining an outer surface of the roller; and
   an intermediate layer between the roller body and the fluoropolymer layer;
   wherein the roller body comprises a plurality of protrusion portions thereon;
   wherein the intermediate layer is formed from a thermally sprayed material and binds the fluoropolymer layer with the roller body; and
   wherein the geometrical configuration of each protrusion portion is a truncated quadrangular pyramid comprising a top area and a bottom area.

2. The roller as in claim 1, wherein the roughness of the outer surface is adjusted the to a range of 0.5 to 5 micrometers, 5 to 15 micrometers, 7 to 10 micrometers, or 15 to 20 micrometers in average roughness.

3. The roller as in claim 1, wherein the area ratio of the top area to the bottom area of the truncated quadrangular pyramid is from 10% to 70%.

4. The roller as in claim 1, wherein the intermediate layer comprises open cells permitting intrusion of fluoropolymer of the fluoropolymer layer.

5. The roller as in claim 4, wherein the intermediate layer comprises a ceramic.

6. The roller as in claim 1, wherein the intermediate layer comprises a first layer and a second layer binding the first layer with the fluoropolymer layer, the first layer binding the second layer with the roller body.

7. The roller as in claim 6, wherein the second layer is different in density from the first layer.

8. The roller as in claim 7, wherein the second layer comprises open cells permitting intrusion of fluoropolymer of the fluoropolymer layer.

9. The roller as in claim 8, wherein the second layer comprises a ceramic.

10. The roller as in claim 8, wherein the first layer comprises a nickel-chromium alloy.

* * * * *